United States Patent [19]

Morine et al.

[11] 4,018,367
[45] Apr. 19, 1977

[54] MANIFOLD DISPENSING APPARATUS HAVING RELEASABLE SUBASSEMBLY

[75] Inventors: Richard L. Morine; James J. Hokes, both of Euclid, Ohio

[73] Assignee: Fedco Inc., Mentor, Ohio

[22] Filed: Mar. 2, 1976

[21] Appl. No.: 663,148

[52] U.S. Cl. .............................. 222/485; 222/545; 222/567

[51] Int. Cl.² ...................... B67D 3/04; A21C 9/00

[58] Field of Search ........... 425/261; 222/450, 476, 222/482–485, 545, 567

[56] References Cited

UNITED STATES PATENTS

| | | | |
|---|---|---|---|
| 2,695,572 | 11/1954 | Oakes | 222/482 X |
| 3,314,575 | 4/1967 | Graham | 222/485 X |
| 3,332,580 | 7/1967 | Spencer et al. | 222/485 X |
| 3,830,608 | 8/1974 | Sebastian | 425/261 X |

Primary Examiner—Robert B. Reeves
Assistant Examiner—David A. Scherbel
Attorney, Agent, or Firm—Daniel G. Blackhurst

[57] ABSTRACT

The specification and drawings disclose a manifold-type dispensing head assembly. The head assembly disclosed comprises an elongated main body adapted to be mounted horizontally and defining a longitudinally-extending main manifold chamber. A plurality of spaced discharge passages extend vertically downwardly from the main manifold chamber. Flow through the discharge passages is controlled by a first longitudinally-extending slide valve mounted in the lower surface of the main body. A dispensing outlet subassembly is releasably connected to the main body beneath the discharge passages. The subassembly includes a recess which extends longitudinally and defines a small secondary manifold chamber which receives flow from the discharge passages. Outlet or dispensing orifices extend downwardly from the secondary chamber at locations corresponding to the desired pattern of discharge. A second valve is carried in the subassembly. The second valve controls the final discharge from the dispensing orifices.

6 Claims, 5 Drawing Figures

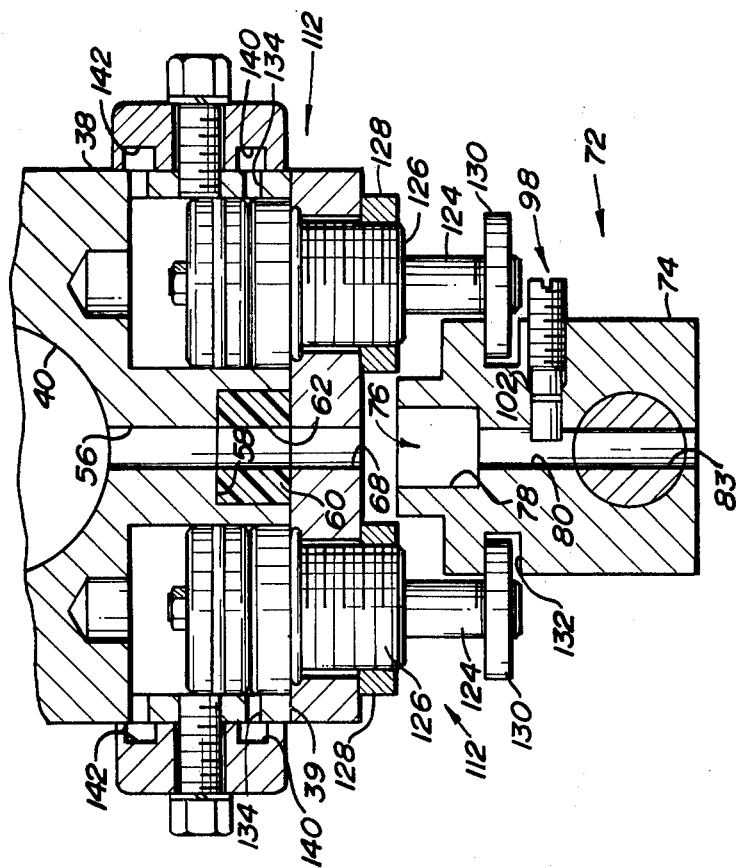
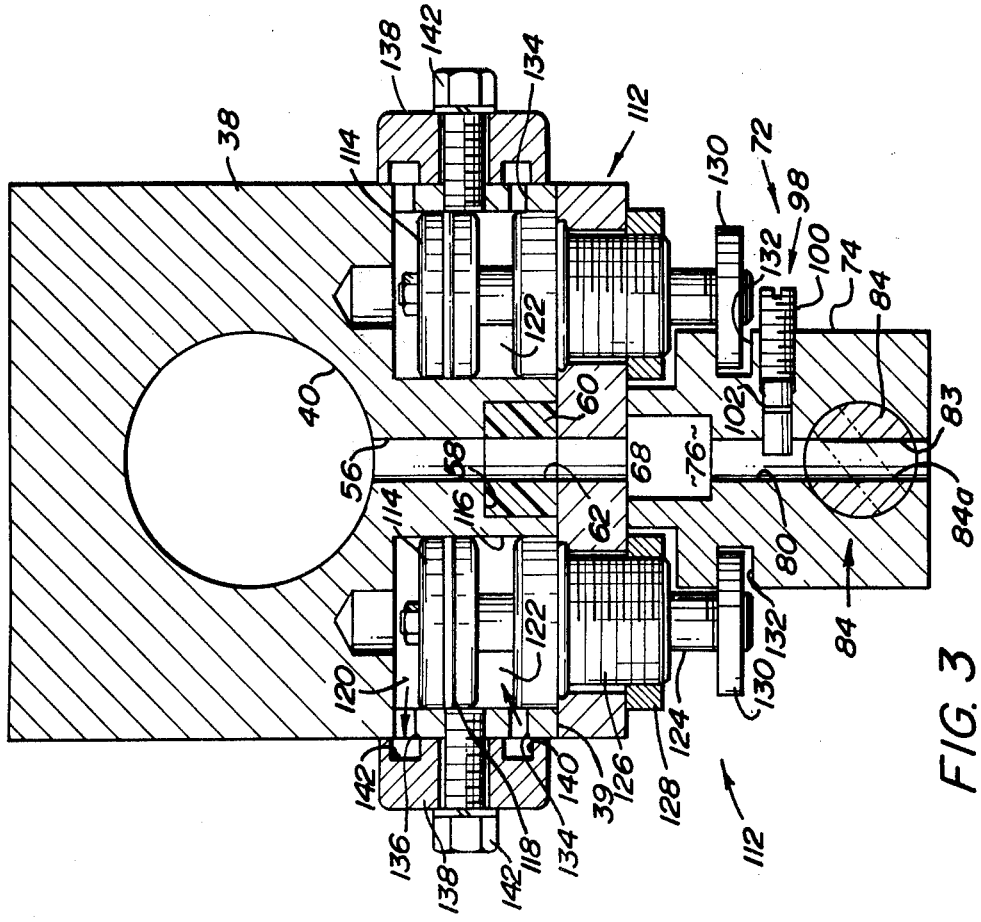
FIG. 4
FIG. 3

MANIFOLD DISPENSING APPARATUS HAVING RELEASABLE SUBASSEMBLY

BACKGROUND OF THE INVENTION

The subject invention is directed toward the art of dispensing and depositing and, more particularly, to a manifold-type dispensing apparatus.

The invention is especially suited for dispensing fluent materials such as batters and icings in predetermined quantities as required in the baking industry; however, as will become apparent, the apparatus formed in accordance with the invention could be used for depositing many different materials of similar characteristics.

In the baking industry, it is common to use manifold-type dispensing heads for dispensing batters and the like into baking pans. Typically, the heads comprise a main manifold or chamber having a plurality of valved outlet orifices or nozzles. The outlet orifices are spaced to generally correspond to the spacing of the sections in individual pans or the spacings of a group of pans strapped together. Generally, for any typical bakery, several head assemblies having different outlet spacings must be provided to suit the many different pan spacings.

Prior dispensing heads of the general type described are shown, for example, in U.S. Pat. Nos. 3,830,608 to Sebastian and 3,054,534 to Vollmer.

One of the primary disadvantages of the prior heads is their fixed outlet spacings. The need for a different head for each different pan spacing or arrangement can result in substantial costs for heads. Additionally, at any one time the majority of the heads are not in use. This, of course, leads to storage and handling problems.

In addition to the above, in recent years there has been a general trend toward larger pan and conveyor arrangements. At present, pans and conveyors as wide as 48 inches are not uncommon. As a consequence, the head assemblies have become of substantial size and weight. This has increased the difficulties involved in changing head assemblies.

BRIEF DESCRIPTION OF THE INVENTION

The subject invention overcomes the above-discussed problems and provides a manifold-type head assembly wherein in the size, spacing, or type of outlet orifices can be rapidly changed. Manifold dispensing assemblies formed in accordance with the invention have great versatility and the major components do not have to be changed or adjusted when the outlet spacing is changed.

In accordance with the subject invention, the assembly preferably comprises a horizontally-extending, elongated manifold chamber adapted to hold a supply of fluent material. A plurality of outlet passages are formed longitudinally of the lower side of the manifold chamber. A first valve means is carried by the manifold chamber and is operable to control flow through the outlet passages. Releasably connected to the manifold chamber is a dispensing outlet subassembly comprising an elongated body having chamber means extending longitudinally and aligned with the outlet passages of the supply manifold to receive flow coming therefrom. Outlet orifices extend from the chamber means and open downwardly to permit flow from the chamber means to dispense downwardly therefrom. Flow through the outlet orifices is controlled by a second valve means carried by the body and operable independently of the first valve means.

Preferably, and in accordance with a more limited aspect of the invention, the first valve means comprises a first elongated valve member mounted for reciprocation longitudinally of the manifold chamber. The first valve member is generally imperforate except for valve openings spaced apart a distance corresponding to the spacing of the outlet passages. The valve member is arranged such that during selective reciprocation the valve openings can be brought into and out of register with the outlet passages to thereby control flow to the chamber means.

The second valve means is preferably, but not necessarily, constructed as a rotary member mounted for oscillation about an axis parallel to the first valve member. The rotary member is preferably a small diameter bar. This allows the dispensing outlet subassembly to be small in comparison to the entire assembly. Additionally, the rotary nature of the valving action provides a clean cutoff.

OBJECTS OF THE INVENTION

Accordingly, a primary object of the invention is the provision of a manifold-type dispensing head wherein the dispensing pattern can be rapidly changed.

A further object of the invention is the provision of an apparatus of the type described in which there is a valved, dispensing outlet subassembly which can be quickly removed from the main head assembly.

Yet another aspect of the invention is the provision of a dispensing head assembly which can be used for either dispensing or injection operations.

Still another object is the provision of an apparatus of the type discussed which is capable of dispensing closely-controllable quantities of fluent material.

BRIEF DESCRIPTION OF THE DRAWINGS

The above and other objects and advantages will become apparent from the following description when read in conjunction with the accompanying drawings wherein:

FIG. 3 is a cross-sectonal view taken on line 3—3 of FIG. 2A; and,

FIG. 4 is a cross-sectional view similar to FIG. 3 but showing the components in position for removal of the outlet subassembly.

DETAILED DESCRIPTION OF THE PREFERRED EMBODIMENTS

Figure 1:
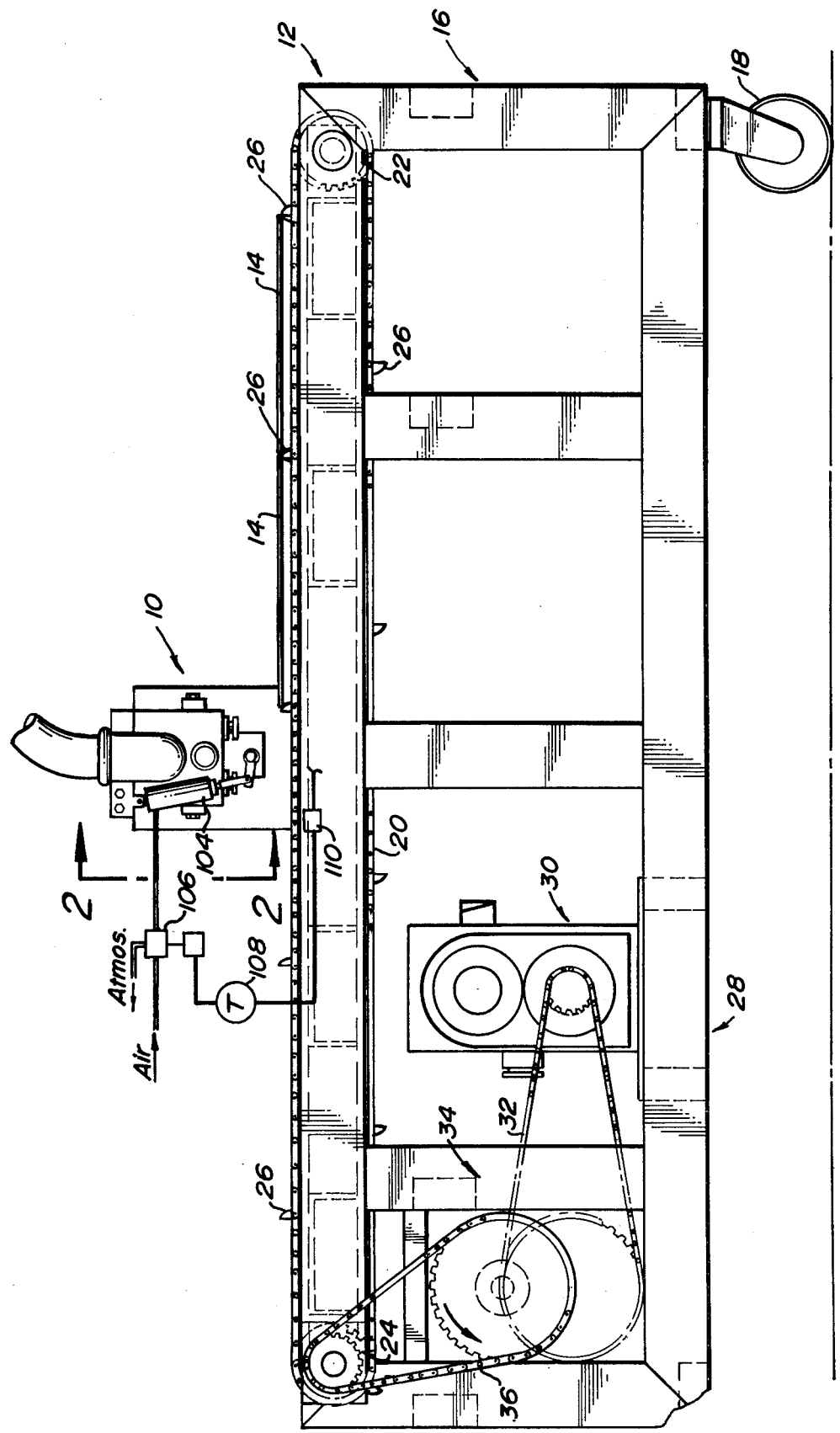
FIG. 1 is an elevational view showing a manifold dispensing head formed in accordance with the invention and associated with a pan conveyor.

Referring more particularly to the drawings wherein the showings are for the purpose of illustrating a preferred embodiment of the invention only, and not for the purpose of limiting same, FIG. 1 shows the overall arrangement of a manifold-type dispensing head assembly 10 mounted to extend over a conveyor 12 and deposit predetermined quantities of cake batter or similar fluent material into pans 14 moved into position under the head.

The conveyor 12 forms no part of the invention but is illustrated merely for the purpose of showing a typical environment for head assembly 10. Broadly, the conveyor 12 comprises a frame 16 mounted on casters 18. A pair of spaced, horizontally-extending conveyor chains 20 are carried at the upper end of frame 16. Chains 20 are trained about sets of sprockets 22, 24 located at opposite ends of the frame. Each chain includes suitable pan-engaging fingers 26 for providing positive movement of the pans.

Chain drive means 28 are carried at the left end of frame 16 for imparting the desired movement to the chains 20. In general, the drive means 28 include an electric motor and gear-reducer unit 30 connected through a roller chain 32 with the input shaft of a conventional drive unit 34. The output shaft of the drive unit 34 is drivingly connected with shaft 23 which carries sprockets 24 by a chain 36.

The above-described arrangement causes pans 14 to be moved serially beneath the dispensing head assembly 10 where predetermined quantities of batter are dispensed into the pans. The head assembly 10 is capable of simultaneously making a row of deposits so as to uniformly distribute the batter across the pan or to fill the individual openings of a cupcake pan or the like. Additionally, the head assembly 10 is arranged for rapid changeover so the number of deposits or deposit spacings can be varied.

Figure 2:
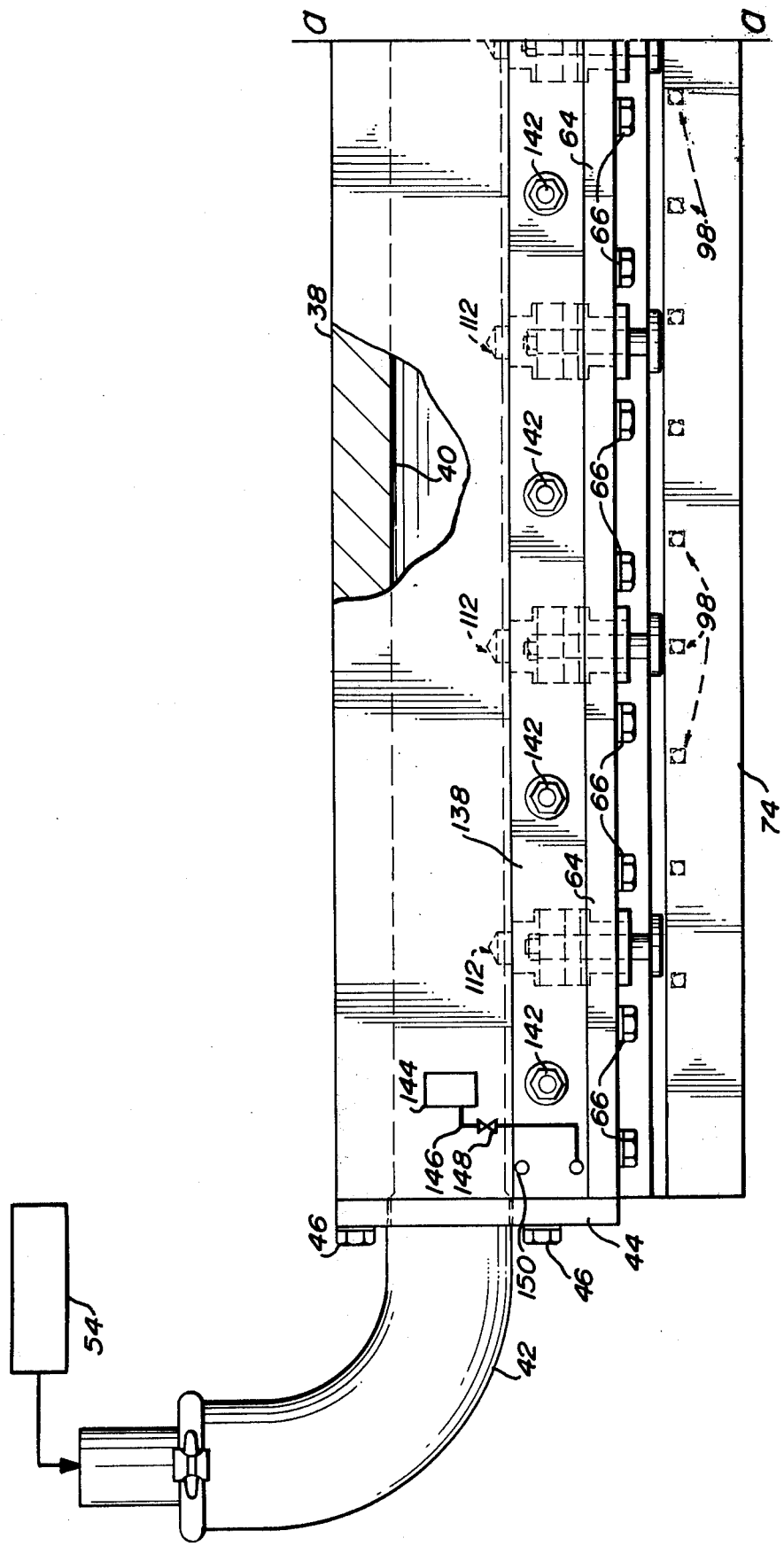
FIGS. 2 and 2A are side elevational views of the manifold head of FIG. 1 (FIGS. 2 and 2A join along match lines a—a)

Although the head assembly 10 could have a variety of constructions, it is preferably formed as shown in FIGS. 2–4. In general, it is illustrated as comprising a main, elongated manifold body 38 formed from any suitable material such as aluminum. A generally cylindrical chamber 40 extends longitudinal through body 38.

Batter is supplied to the left end of chamber 40 (FIG. 2) through an elbow 42. The elbow 42 is carried by an end plate 44 which is releasably connected to main body 38 in any suitable manner such as by machine screws 46.

Batter is also supplied to the right end of chamber 40 through an elbow 48 carried by an end plate 50. End plate 50 closes the end of body 38 and is releasably connected thereto by machine screws 52.

Figure 2A:
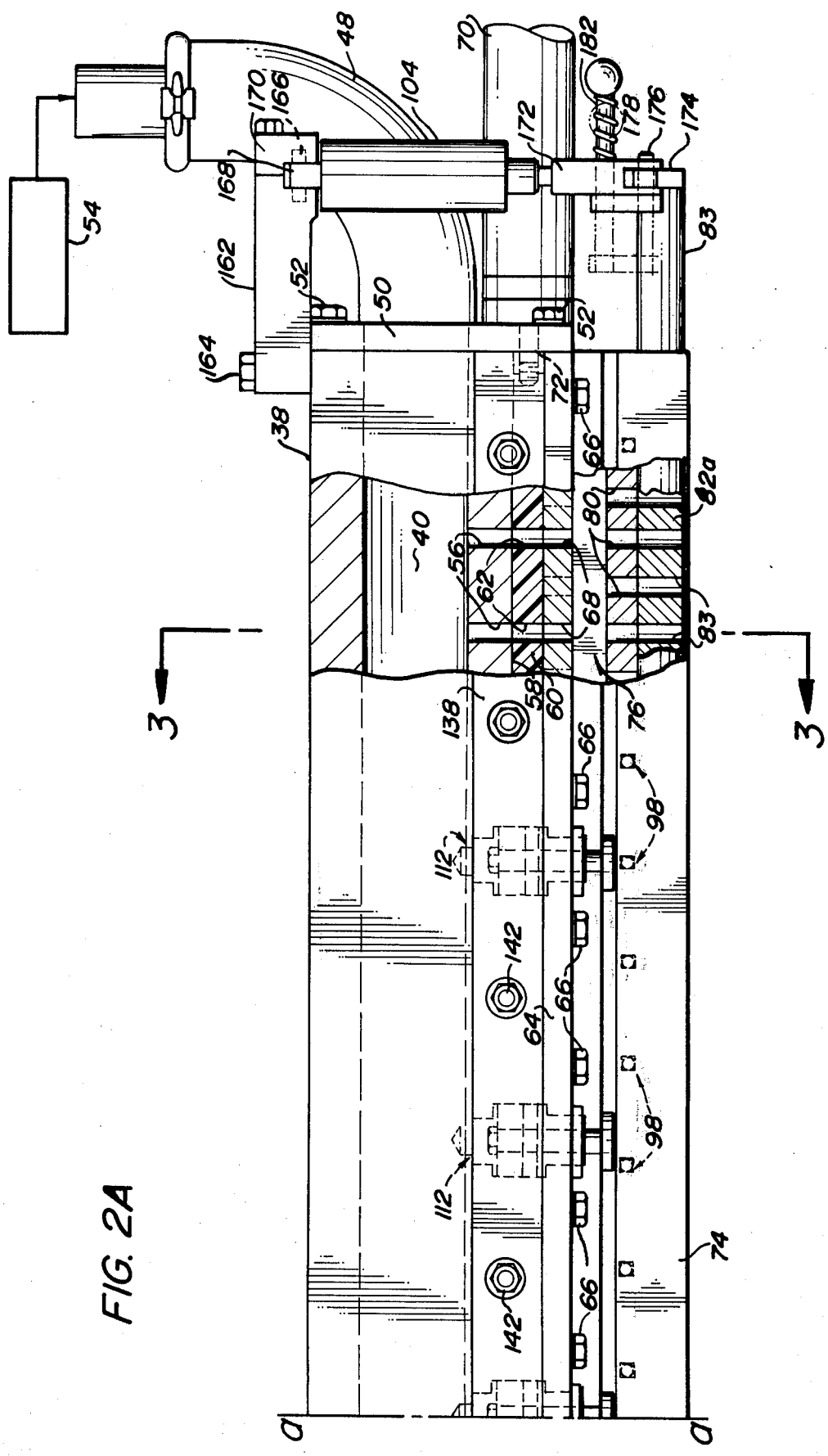

Typically, the inlet ends of elbows 44 and 50 are connected through releasable connections with a batter source or conventional pump supply 54 illustrated diagrammatically in FIGS. 2 and 2A.

The chamber 40 is communicated with the lower side of body member 38 by a plurality of longitudinally-spaced outlet passages 56. Preferably, the passages 56 are spaced comparatively close and uniformly throughout the length of chamber 40.

Extending inwardly throughout the lower surface 39 of body 38 and longitudinally aligned with the outlet passages 56 is a generally rectangular recess 58.

Closely but slidably received within recess 58 is an elongated slide valve member 60. Valve member 60 can be formed from a variety of materials but is illustrated as plastic, preferably a high-density polyethylene. Extending transversely through member 60 are a plurality of valve orifices 62. The orifices 62 correspond in size and spacing to the outlet passages 56 in body 38.

The valve member 60 is retained in recess 58 by a bottom plate 64 which is connected to body 38 by a plurality of machine screws 66 (see FIGS. 2 and 2A). Orifices 68 are formed through plate 64 in general alignment with passages 56.

As can be appreciated, with slide valve member 60 in the solid-line position shown in FIG. 2A, batter can flow freely from chamber 40 and out orifices 68. However, when moved to the dotted-line position, flow is blocked through passages 56.

Many different means, either power or manual, could be provided for shifting valve member 60 between the open and closed positions. In the subject embodiment, however, the means comprise a small air cylinder 70 mounted on the right end plate 50. The outer end of the piston rod 72 of cylinder 70 extends freely through end plate 50 and is threadedly or otherwise releasably connected to the end of valve member 60. Consequently, by controlling the flow of air to cylinder 70, the valve member 60 can be selectively moved between open and closed positions.

Of particular importance to the subject invention is the arrangement whereby a dispensing outlet subassembly 72 is releasably connected to the main body 38. The subassembly 72 includes its own independent valve means and allows for rapid changeover of the apparent for a variety of dispensing patterns or dispensing outlet spacings.

While the subassembly 72 could take a variety of different forms within the scope of the invention, the structure illustrated has been found to be particularly advantageous. Specifically, in the embodiment shown, the subassembly 72 comprises a secondary manifold body 74 formed from aluminum or other suitable material. Body 72 has a generally rectangular cross-section and extends the length of main body 38. A manifold chamber 76 is formed longitudinally of the upper surface by a slot or recess 78. Chamber 76 is located such that when subassembly 72 is in the operating position shown in FIG. 3, it receives the flow coming from orifices 68.

Extending from chamber 76 are dispensing orifices 80. Orifices 80 are spaced and located to correspond to the dispensing pattern desired. Flow through the orifices 80 is controlled by an elongated rotary valve member 82 comprising a cylindrical rod 82a carried in an opening 84 which extends longitudinally of the body 74 and aligned with orifices 80. Member 82 is provided with diametrically-extending valve openings 83 spaced to correspond to orifices 80.

As is apparent from the foregoing description, oscillation of the valve member 82 between the solid-line and dotted-line positions (see FIG. 3) controls flow through the dispensing orifices 80. Generally, because the batter is supplied to the small, secondary manifold chamber 76 from the larger chamber 40 by a multiplicity of uniformly-spaced small passages 56, the pressure within chamber 76 will be comparatively uniform. This will normally assure relatively uniform flow per given time period through the dispensing orifices 80. However, depending upon the spacing of orifices 80, the type of batter and similar factors, it may be necessary to balance the flow through the orifices. In order to permit fine balancing, each outlet orifice 80 is provided with a balancing valve 98. In the embodiment illustrated, each balancing valve comprises a pin member 100 extending through the side of body 74 and intersecting a respective outlet orifice 80. An O-ring 102 is received about the outer surface of the unthreaded inner end of each pin member to provide a fluid seal. As is apparent, by adjusting the position of the pin members their inner ends can vary the effective flow area through the respective orifices 80. Consequently, extremely fine balancing can be achieved.

Many different types of operators could be provided for oscillating valve member 82 between its open and closed positions. In the subject embodiment, the means comprise an air cylinder 104 carried from a bracket extending outwardly from the end of body 38. The outer end of piston rod 106 is releasably connected to valve member 82. Referring more particularly to FIGS. 1 and 2A, it will be noted that the air cylinder 104 has its cylinder end pivotally supported from a bracket 162 suitably connected to body 38 by bolts 164. A pin 166 extends from the end of bracket 162 and through a lug 168 on cylinder 104. An end plate 170 releasably connected to bracket 162 retains lug 168 on pin 166.

The rod end of cylinder 104 includes a clevis 172 which receives a short operating rod 174. A pivotal connection between clevis 172 and arm 174 is provided by a pin 176 connected to a plate 178 and passing through openings in the clevis 172 and arm 174. An operating shaft 180 is also connected to plate 178 and passes freely through clevis 172. As shown, the pin 176 is normally maintained in the solid-line connecting position of FIG. 1 by a spring 182. However, it can be manually moved to the dotted-line position to release the arm 174 by pushing on operating rod 174.

The particular means used for controlling air supply to cylinder 104 are not important to the invention; however, as diagrammatically shown in FIG. 1, the means preferably comprise an air supply valve 106 actuated through an adjustable timer 108 from a pan sensing switch 110. Switch 110 is positioned to be engaged whenever a pan is in location beneath the head assembly. The use of the timer 108 permits the open period of valve member 82, and consequently the quantity dispensed, to be adjusted.

The compact and relatively small size of the subassembly 72 makes it possible to change the subassemblies quickly to thereby change the dispensing outlet pattern. In order to facilitate the changeover operation, the subject apparatus includes quick-release clamping means for connecting the subassemblies to the main manifold body. Although many types of suitable clamping means could be provided, the subject invention uses a plurality of air-actuated clamps 112. The clamps 112 are located in rows extending longitudinally of the main body on opposite sides of the vertical center line.

In the embodiment shown, each of the clamps 112 are identical. Accordingly, only one will be described; and the description thereof is to be taken as equally applicable to the others. Specifically, each clamp 112 comprises a piston 114 mounted for vertical reciprocation in a bore or cylinder 116 formed inwardly from the bottom of body 38 (see FIGS. 2, 2A and 3). An O-ring 118 is carried about each piston 114. This divides each cylinder 116 into upper and lower sealed chambers 120 and 122, respectively.

Extending downwardly from each piston 114 are piston rods 124. Suitable guide sleeve members 126 seal the lower end of each bore 116 and guide the associated piston rods 124. In the embodiment shown, the sleeve members 126 have a smaller diameter lower end portion which extends through bottom plate 64 and is clamped thereto by a nut 128.

A clamp element 130 is carried at the lower end of each piston rod 126 for engagement with grooves 132 which extend longitudinally of body 74. Elements 130 are illustrated as circular, metal discs threaded to the rods 126.

With pistons 114 in the upper or clamp position shown in FIG. 3, the subassembly 72 is clamped in sealed, operational relationship with main body 38. However, when the pistons are permitted to move to their lower position shown in FIG. 4, the subassembly 72 is unclamped from the body 38. Thereafter, it can be slid longitudinally out of the assembly. A different subassembly can then be moved into position if desired, and the clamps 112 re-actuated.

To effect the clamping operation, air under pressure is supplied to each chamber 122 through openings 134 formed laterally into the lower end of each bore 116. Similar openings 136 extend into the upper end of each bore 116 to connect each upper chamber 120 with the atmosphere.

In the subject embodiment, conduit-forming plates 138 are connected to each side of main body 38 by machine screws 142. As seen in FIGS. 2, 2A and 3, the plates 138 extend the length of the main body and have spaced grooves 140 and 142 formed in their inner faces to respectively connect all openings 134 and 136 in common. As shown diagrammatically, a source of pressurized air 144 is connected to groove 140 through a line 146 having a manually-operable valve 148 (see FIG. 2). Each of the grooves 142 are connected to atmosphere through suitable openings 150.

The invention has been described with reference to depositing operation only; however, by providing needle-type discharge members on the outlet end of orifices 80, the assembly can be used for injecting operations of the type described in our prior U.S. Pat. No. 3,760,989.

The invention has been described in great detail sufficient to enable one of ordinary skill in the art to make and use the same. Modifications and alterations of the preferred embodiments will occur to others upon reading and understanding of the subject specification. It is our intention to include all such modifications and alterations as part of our invention insofar as they come within the scope of the appended claims.

Having thus described our invention, we claim:

1. Apparatus for dispensing fluent material in a predetermined pattern comprising:
  a. a main, elongated body mounted to extend horizontally and defining a horizontal main manifold chamber;
  b. a plurality of discharge passageways extending downwardly from said main manifold chamber;
  c. first valve means carried by said main body for controlling flow through said passageways;
  d. a dispensing outlet subassembly releasably clamped to said main body and defining a secondary manifold chamber for receiving flow from said discharge passageways;
  e. a plurality of dispensing orifices extending downwardly from said secondary manifold chamber and laid out in a pattern corresponding to said predetermined pattern; and,
  f. second valve means carried by said subassembly and operable independently of said first valve means for controlling flow through said dispensing orifices.

2. The apparatus as defined in claim 1 wherein said first valve means includes a slide valve member extending longitudinally of said main body.

3. The apparatus as defined in claim 2 wherein said second valve means comprises a single rotary valve member extending longitudinally of said subassembly and parallel to said slide valve member.

4. The apparatus as defined in claim 1 wherein said secondary manifold chamber is substantially smaller than said main manifold chamber and is defined by an elongated recess formed in said subassembly.

5. The apparatus as defined in claim 1 wherein said subassembly is clamped to said main body by a plurality of air-operated clamp members carried by said main body.

6. The apparatus as defined in claim 1 including separate power means for actuating said first valve means and said second valve means.

* * * * *